Nov. 18, 1924.　　　　　　　　　　　1,516,163

C. L. TOLLES

STAKE HOLDER

Filed Oct. 22, 1923

Inventor
CHARLES L. TOLLES

By Paul, Paul & Moore

ATTORNEYS

Patented Nov. 18, 1924.

1,516,163

UNITED STATES PATENT OFFICE.

CHARLES LYMAN TOLLES, OF EAU CLAIRE, WISCONSIN.

STAKE HOLDER.

Application filed October 22, 1923. Serial No. 670,145.

*To all whom it may concern:*

Be it known that I, CHARLES L. TOLLES, a citizen of the United States, resident of Eau Claire, in the county of Eau Claire and State of Wisconsin, have invented certain new and useful Improvements in Stake Holders, of which the following is a specification.

The object of my invention is to provide a stake holder adapted for use on either logging sleds or logging cars and the particular object of the invention is to provide a locking device for the holder of inexpensive construction that will be positive and reliable in its operation and at the same time strong and durable and capable of withstanding the rough usage to which a device of this kind is frequently subjected.

The general application of stake holders to sleds and cars is well known, the purpose being to provide a holding means for the stakes on one side of the car, which can be released by the operator standing on the opposite side of the car, as the stakes, when released, allow the logs to roll or tumble off the load, and a person attempting to release a stake standing on the same side of the car or sled would have no time to get out of the way of the logs and most sleds or cars used for logging purposes are now equipped with some device for releasing the stakes on the side opposite to that of discharge or delivery of the load.

My invention consists in the improved locking means all as hereinafter described and particularly pointed out in the claims.

In the accompanying drawings, forming part of this specification;

Figure 1:
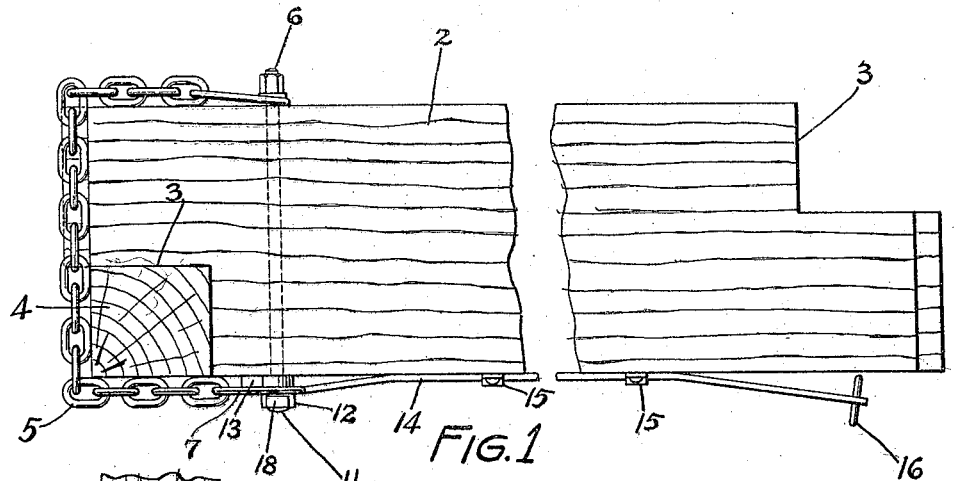
Figure 1 is a plan view illustrating the application of my invention to a sled bunk or beam.
Figure 2:
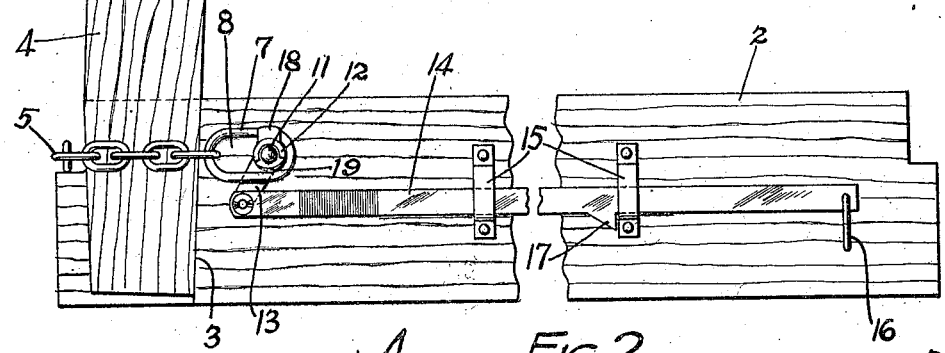
Figure 2 is a side view.
Figures 3, 4:
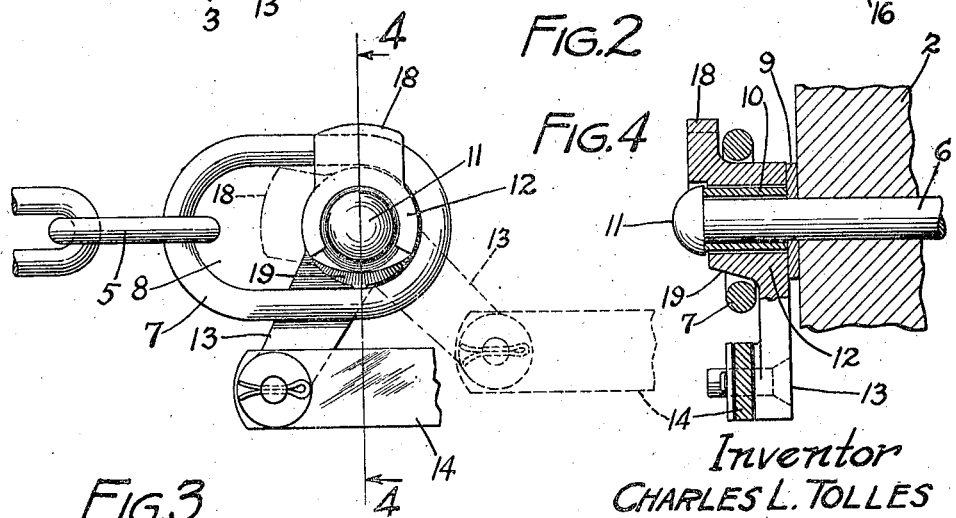
Figures 3 and 4 are views showing the details of construction of the locking device.

In the drawing, 2 represents a portion of a sled bunk having a seat or socket 3 to receive the lower end of the stake 4. It will be understood that this stake in its upright position holds the logs on the sled or car and any suitable number of stakes are provided for this purpose. A flexible means such as a chain 5 is anchored by suitable means such as a bolt 6 to the bunk and extends around the end thereof and across the socket and the stake fitting therein. The loose end of the chain has a link 7 that is larger, preferably, than the other links and has an elongated oval opening 8 therein. A bolt projects from the bunk adjacent this link and may be a continuation of the bolt 6 which supports the other end of the chain. A washer 9 is mounted on the bolt and a bushing 10 in the form of a cylinder is seated on the washer and held in place by the head of the bolt or a suitable nut 11 thereon. 12 is a hub that is mounted on the bushing 10 to turn freely thereon, and is provided with an arm 13 to which an operating bar 14 is pivotally connected, said bar sliding in guides 15 on the bunk and extending to the opposite side thereof and having a hand grip 16 by means of which the user can move the bar longitudinally as desired. A stop 17 is provided on the bar 14 in position to engage one of the guides 15 to lock the bar against longitudinal movement until it is lifted vertically to clear the stop of the guide.

The hub 12 is provided with a lug 18 on the side thereof opposite from the arm 13 and adjacent the arm 13 has an inclined surface 19, the lug 18 projecting across the link and holding it in place on the hub as long as the arm 13 is in a transverse position with respect to the link. As soon, however, as the bar 14 is moved longitudinally to swing the arm 13 into alignment therewith the hub will be rotated, the lug 8 will be disengaged from the link 7 and, swinging into the oval opening 8, will release the link and the inclined surface 19 will be moved into contact with the end portion of the link and cause it to slide off the hub and drop by gravity down away from the stake releasing it and the load.

With this device the stake will be firmly held in its upright position until such time as the operator moves the bar 14 and swings the locking device from its upright to a horizontal position. The use of the washer 9 and the bushing insures freedom of operation of the lock under all conditions of pull of the chain therein.

In applying the stake holder to a flat car, the means extending across the stake is preferably modified somewhat in construction; its function, however, is substantially the same as the chain described and the locking device at the end of the stake holding means will be the same on a sled or flat car, and as my invention includes this particular part of the device, I have not thought it necessary to illustrate the application of the invention to a flat car.

In various ways the details of construction herein shown may be modified and still be within the scope of my invention.

I claim as my invention:

1. The combination with a bunk having a stake socket and a stake fitting said socket, of flexible means adapted to extend across said stake and socket, a link provided at the free end of said flexible means and having an elongated opening, an oscillating hub adapted to enter said opening and having a lug on one side and an oppositely arranged inclined surface, said lug in its locking position extending transversely of said opening and engaging said link to hold it on said hub, and means for rotating said hub to swing said hub to a releasing position lengthwise of said link and said inclined surface into contact with the end bearing portion of said link to cause said link to slide by gravity therefrom and release said stake.

2. The combination with a bunk having a stake socket and stake fitting said socket, of flexible means adapted to extend across said stake and socket, a link provided at the free end of said flexible means and having an elongated opening, an oscillating hub mounted on said bunk and adapted to enter said opening and having a lug on one side and an arm projecting from its opposite side and also having an inclined bearing surface, said lug in its locking position extending transversely of said opening and engaging said link to hold it on said hub, and means operated from a remote point and connected with said arm for rotating said hub on its axis to swing said lug to a releasing position lengthwise of said link and move said inclined surface into contact with the end bearing portion of said link and thereby cause said link to slide by gravity off said hub.

In witness whereof, I have hereunto set my hand this 11th day of October, 1923.

CHARLES LYMAN TOLLES.